United States Patent Office 3,565,986
Patented Feb. 23, 1971

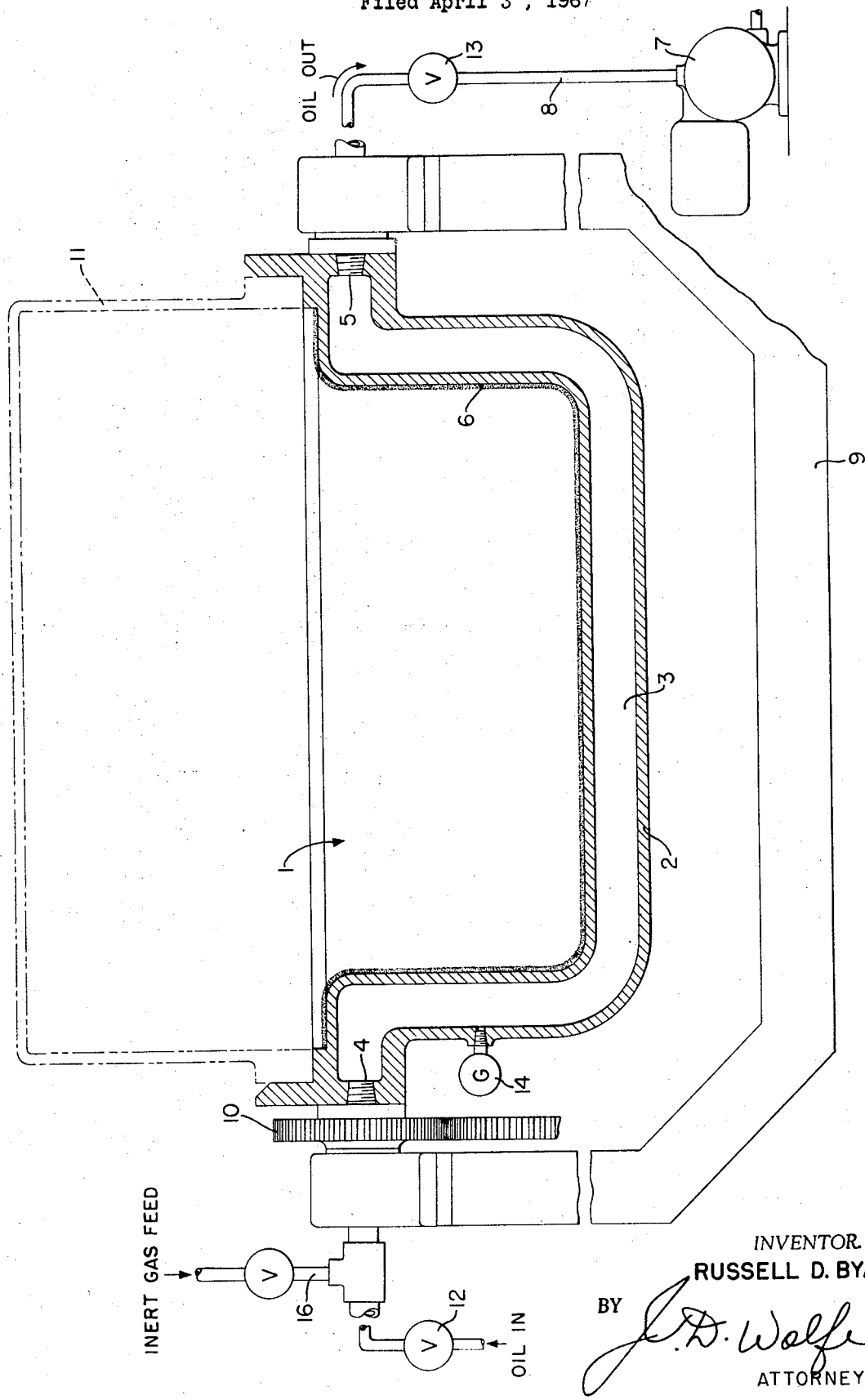

3,565,986
METHOD OF HEATING ELECTROFORM MOLDS
Russell D. Byall, Stow, Ohio, assignor to The Goodyear Tire & Rubber Company, Akron, Ohio, a corporation of Ohio
Filed Apr. 3, 1967, Ser. No. 628,107
Int. Cl. B29c 1/00
U.S. Cl. 264—302                                        2 Claims

ABSTRACT OF THE DISCLOSURE

This invention relates to a method of heating molds for use in molding thermoplastic material whereby the heating and cooling cycles of the mold are such that the small microscopic cracks or holes in the electroform molds do not leak oil into the molding cavity to thereby mar, discolor and ruin the molded article. More specifically, this method of molding feeds the heating medium or oil to the mold at a pressure of at least atmospheric or higher and removes the oil from the other side of the mold at a pressure less than atmospheric to obtain throughout the mold on the heating medium side a pressure less than atmospheric.

---

This invention relates to a method of molding thermoplastic materials using molds which have a tendency to lose heating medium. More particularly, this invention relates to a method of heating electroform molds which have microscopic holes that tend to enlarge with use into cracks through which the heating medium migrates into the molding cavity, is prevented by maintaining the heating medium while in the mold at a pressure less than atmospheric.

The use of thermoplastic material to form molded articles is relatively old and the use of electroform molds to produce molded articles from thermoplastic materials which have highly aesthetic features has been practiced where the molds were heated by radiant heat or other suitable heating means but my experience is that when the electroform molds have been attempted to be heated by hot oil and then cooled with a cold oil the electroform molds have cracked. Consequently, the heating oil has tended to seep or wick into the molding cavity to disfigure and ruin the molded article. Not only has the wicking or weeping of the oil into the mold cavity disfigured the molded article but it has presented certain physical hazards to the mold operator as the oil tends to spray out and burn the operator.

It is an object of this invention to provide a method of using molds and particularly electroform molds which avoid the difficulties associated with the wicking or weeping of the heating medium into the mold cavity and also the health hazard associated with the use of heating oil with these molds.

The objects and advantages of this invention may more readily be understood by reference to the drawing which shows a cross section through a typical electroform mold. More specifically, numeral 1 represents an electroform mold having an outer shell 2 to form a heating medium cavity 3 which has a heating medium inlet 4 and outlet 5. It should be readily appreciated that the cavity 6 in which the molded article is formed when formed by the electroform process will have all the intricate details of the molded article desired. For instance, if a simulated leather is desired, then the electroform mold will have the texture of a leather product and the molded article produced therein will have a surface similar to that of the electroform surface of the mold.

In this invention it is desired to pump the heating medium or fluid such as a suitable heating oil, for example, one of the diphenyl or diphenyl ether type or mixtures thereof into the inlet of the mold 4 and through the heating cavity 3 and out the hot oil outlet 5. It is a desirable feature of this invention that the hot oil into the mold 4 be fed at a pressure of at least atmospheric and preferably at slightly above atmospheric, usually no more than about 1 to 30 pounds per square inch gauge and preferably about 3 to 10 pounds per square inch gauge, with the size of the inlet 4 being adjusted to permit a pressure to be maintained within the heating cavity 3 of less than atmospheric, i.e., less than 14.7 p.s.i.g. Thus, the oil outlet 5 would be maintained under a pressure less than atmospheric to assure the rapid movement of the heating medium from the oil inlet 4 through the cavity 3 and out the outlet 5. Since there will be a slight vacuum within the cavity 3 it should be readily apparent that any cracks or pinholes within the electroform section of the mold would admit air into the heating cavity 3. Therefore, it may be necessary with some heating mediums that a small amount of an inert gas such as carbon dioxide or nitrogen be bled into or fed into the oil, by the time it is fed into the oil inlet 4 to blanket the oil within the heating cavity 3 to prevent its oxidation and other degrading effects due to the presence of an excessive amount of oxygen. Since the cracks that initially form within the electroform section 6 of the mold are relatively small and microscopic the powdery or highly viscous thermoplastic materials used as a molding material will not flow through these holes to an appreciable extent and in fact will tend to form bridges that block these holes to thereby permit this method to be used successfully to mold thermoplastic materials.

The practice of the present invention may be more specifically exemplified by reference to FIG. 1 which shows the mold containing therein a dry powdery thermoplastic material such as a plasticized polyvinyl chloride. The hot oil at about 500 to 550° F. and at about 5 pounds per square inch gauge pressure is fed into the mold through the mold inlet 4 and is removed from the mold by outlet 5 by the action of a pump 7 which maintains a pressure less than atmospheric, i.e. less than 14.7 pounds per square inch absolute pressure within the line 8 from the outlet 5 to the pump. When the mold has reached the molding temperature, the thermoplastic powdered material is added to the cavity of the mold and the mold is rotated to coat the surface of the mold and build up a skin or film thereon. The excess thermoplastic material may be dumped. After a few seconds to a minute of fusing time to make sure that all of the thermoplastic material within the mold cavity has fused, the mold is ready to be cooled, at which time the hot oil to the mold is stopped and cold oil at about 100 to 150° F. is fed into the mold through mold inlet 4 at a pressure of about 5 pounds per square inch gauge. It should be noted that the pump 7 will continue to operate and remove the cold oil as it flows through and thereby maintain a pressure from the cold oil outlet 5 in the line 8 of below atmospheric pressure. Likewise, this pressure differential between oil inlet 4 and outlet 5 will reduce the pressure below atmospheric in the mold heating cavity 3. Thus, during the heating and cooling of the mold the mold heating cavity 3 is maintained at a pressure less than atmospheric, preferably about .5 to 14 pounds absolute pressure. As soon as the mold temperature has dropped below the thermoplastic temperature of the molding material the formed skin may be suitably removed by grasping it by the hand in cooperation with a blast or jet of air pressure between the skin and the mold surface. Thus, when the skin is removed, the vacuum on the mold will keep any cooling oil from wicking or weeping out into the mold cavity.

Referring to the drawing it will be noted that the mold is mounted in a frame 9 and has a gear means 10 for rotating the mold when desired. Also, it will be noted that a box 11 to hold a thermoplastic material is shown in dotted outline resting in a mated position on the mold. Valves 12 and 13 are shown in the inlet and outlet lines respectively for the heating medium to permit the vacuum on the heating medium in the mold cavity 3 to be adjusted as would be readily indicated by the pressure gauge 14. A line 16 for feeding an inert gas is shown on the inlet side of the mold.

It should be readily appreciated that this invention may be practiced with any of the thermoplastic materials useful for molding. Representative of these are the liquid and dry plasticized polyvinyl chloride and related vinyl polymers, polystyrene and terpolymers of acrylonitrile, butadiene and styrene.

A further advantage of this invention as should be evident from the aforementioned disclosure, is that it permits molds to be made which are lighter in weight as less structural strength is required in both the mold and in the shell, as these do not have to withstand substantial pressure.

While certain representative embodiments and details have been shown for the purpose of illustrating the invention, it will be apparent to those skilled in this art that various changes and modifications may be made therein without departing from the spirit or scope of the invention.

What is claimed is:

1. In a method of molding a thermoplastic material selected from vinyl polymers, polystyrene and terpolymers of acrylonitrile, butadiene and styrene by heat fusing said material to coat the surface of the mold and build up a skin thereon and then cooling the mold to permit said skin to be removed and wherein the mold is one which tends to form cracks through which the heating medium migrates into the molding cavity, the improvement wherein a fluid medium is fed at a pressure above atmospheric to the cavity formed between the mold and the shell to heat the mold to fuse the thermoplastic material and then to cool the mold to permit the skin to be removed and the fluid medium is removed from the cavity at a pressure less than atmospheric to leave the pressure on the fluid medium within the cavity at a pressure less than atmospheric.

2. The method of claim 1 wherein the pressure on the fluid medium as it is fed to the mold is about 1 to 30 pounds per square inch gauge and on the fluid medium leaving the mold sufficiently low to give a pressure within the mold of less than 14.7 pounds per square inch absolute pressure.

References Cited

UNITED STATES PATENTS

| | | | |
|---|---|---|---|
| 2,650,409 | 9/1953 | Dubbs | 264—87 |
| 3,284,917 | 11/1966 | Foote | 264—87 |
| 3,353,219 | 11/1967 | Snyder | 264—87 |

DONALD J. ARNOLD, Primary Examiner

A. H. KOECKERT, Assistant Examiner

U.S. Cl. X.R.

18—38; 249—80; 264—327